Aug. 10, 1965   A. BRAUN ETAL   3,199,322
LOCKING LATCH DEVICE FOR AUTOMOBILE
Filed March 5, 1964
2 Sheets-Sheet 1

Adolph Braun
and
Andrew Skrapits
INVENTORS

BY Albert S. Kirchner
ATTORNEY

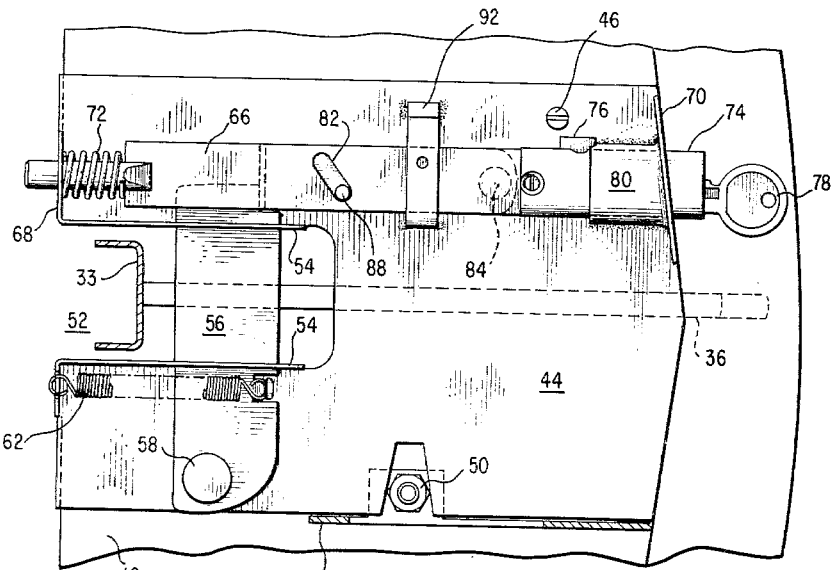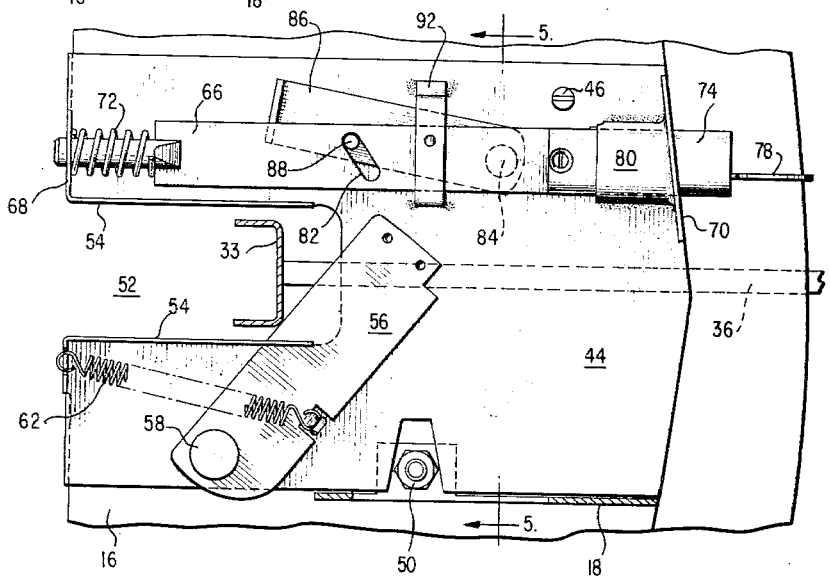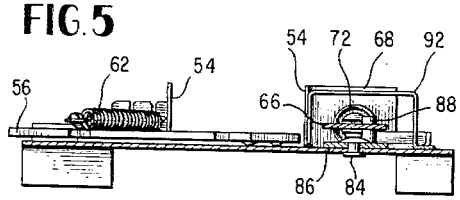

United States Patent Office 3,199,322
Patented Aug. 10, 1965

3,199,322
LOCKING LATCH DEVICE FOR AUTOMOBILE
Adolph Braun and Andrew Skrapits, Bronx, N.Y., assignors to Bronx Locksmiths, Inc., New York, N.Y., a corporation of New York
Filed Mar. 5, 1964, Ser. No. 349,588
7 Claims. (Cl. 70—240)

The present invention provides a means for latching closed, under the control of a key-operated lock, the engine compartment of a conventional type of automobile.

More particularly, the invention proposes a means for preventing unauthorized access to the engine and its immediate appurtenances, including particularly the automobile storage battery, by providing a locking latch for the hood of the car.

An important object of the invention is to provide antitheft protection for the battery and other easily removable instrumentalities of the engine compartment by means that can be constructed and installed at very low cost, which will be inconspicuous in placement so as to constitute no interference with any of the operating or structural parts of the car, which will be tamperproof to a high degree, which will be dependable and reliable in operation, and which will be readily adaptable by minor adjustments and alterations all within the broad principles of the invention for application to a wide range of different hood mountings.

With the foregoing and other objects and advantages in view, all of which will sufficiently appear to those skilled in the art as the following description of a preferred embodiment of the invention proceeds, the device consists essentially in a self-contained mechanism comprising a housed linkage adapted to be mounted beneath an automobile hood, immediately in front of the radiator, on a structural part of the car, containing a detent that normally embraces and holds against movement the conventional hook arm that holds the hood in closed position and thus prevents movement of the arm to a position releasing the hood for rising to opening position but which can be liberated for freeing the arm for releasing movement upon the operation of a key in a lock forming part of the mechanism.

A preferred embodiment of the invention, which has been thoroughly tested in actual practice and found entirely satisfactory and hence is at present preferred, is illustrated in the accompanying drawings forming part of this application in which FIGURE 1 is a vertical sectional view through the forward end of a typical automobile construction, between the radiator and the grille, showing a conventional type of hood latching mechanism and the relationship thereto of our new locking latch device when installed therewith;

FIG. 3 is a horizontal sectional view showing the operating parts of the locking latch device in plan, with the cover removed and with the parts shown in position locking the hood latching lever in closed position;

FIG. 4 is a similar view but showing the parts in position unlocking the hood latching lever and with said lever moved to hood releasing position; and FIG. 5 is a vertical sectional view taken on the line 5—5 of FIG. 4, looking in the direction of the arrows.

In these figures the locking latch device provided by the invention is shown in operative position installed in a typical conventional present day automobile model having a hood or bonnet covering the engine compartment, hinged at or near its rear portions and provided at its front, free end with means normally latching that end down in engagement with fixed front structure of the car. In such constructions means are provided for manually releasing the latch so that the hood can on occasion be opened, by elevating the free front end and swinging the hood up about its rear hinges. This of course is necessary to provide access to the radiator, the engine, the battery and other appurtenances in the engine compartment. The purpose of the present invention is to add to such standard construction a key-controlled lock which will prevent unauthorized manual operation of the latching mechanism to hood-releasing position, thus inhibiting theft of the battery and other readily removable parts and preventing vandalism and kindred abuses which have lately been on the increase and have augmented the need for such protection as is afforded by the present invention.

Broadly speaking, the conventional latching arrangement includes a lever which is manually operable by an actuating element accessible from the front of the car so as to swing from hood latching to hood releasing position, and the present invention provides a detent which normally prevents movement of the lever from its latching position but which can be operated to free the lever for movement to hood releasing position under the control of a lock, such as a key operated lock, which is accessible in or through the grille at the front of the car, conveniently located adjacent to the manually operable actuating element.

Figure 1:
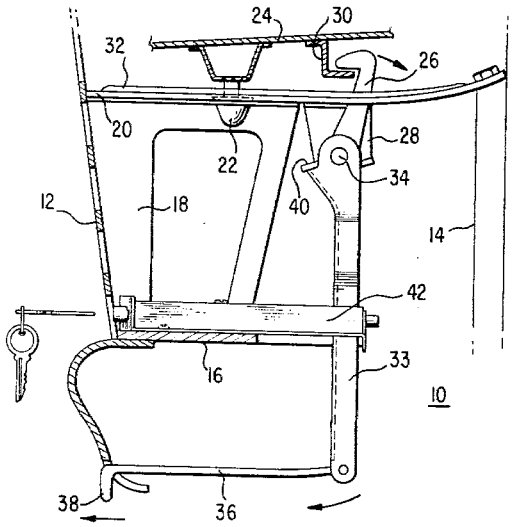

In more detail, as shown by the drawings, the preferred embodiment of the invention comprises the following parts and relationships:

FIGURE 1 shows the forward portion of the car, comprising the space 10 between the grille 12 and the plane of the radiator 14. Horizontally disposed in this space, generally in about the center line of the car, is a bed plate 16, securely bolted in position between a pair of side struts 18, or in some cases next to a single such strut, whose upper end supports a fixed latch plate 20 that extends horizontally generally over the area of the bed plate 16.

In the typical construction this latch plate is suitably apertured with two openings, a forward one which admits the enlarged undercut head 22 of a stout pin that depends from a bracket 24 secured to the under surface of the hood of the car, and a rear opening which passes a short hook 26 that is pivoted on a short bracket 28 depending from the under side of the latch plate. This hook cooperates with a keeper 30 secured to the under side of the hood bracket 24. A top plate 32 is suitably apertured to pass the hook 26 and the head 22 and is mounted on the latch plate 20 for sliding forwardly and rearwardly under the control of the hook in its swinging movement. All this arrangement is old and well known and requires no further explanation. It will be understood that in use the hood is normally held latched in closed position by engagement of the hook 26 with the keeper 30 and the overlapping of the head 22 by the top plate 32, and that the hood can be released by movement of the hook 26 rearwardly. This movement disengages the hook from the keeper 30, and at the same time, or on continued movement of the hook, the hook shifts the top plate 32 rearwardly to free the head 22, so that the hood, which is rigidly connected to the bracket 24, is now free to be raised to open position.

In order to enable this freeing movement to be made whenever it is desired to have access to the engine compartment of the car, the typical construction includes a latching lever 33 which is pivoted to the bracket 28 at 34 and extends vertically down to a pin connection with a pull rod 36. The latter protrudes through the grille 12, or through the front end structure below the grille, and terminates in a hook or hand hold 38 which is accessible from the front of the car. A shoulder on the upper end of the latching lever 33 bears against an ear 40 on the end of the hook 26, so that when the rod 36 is pulled, and the latching lever 33 swings clockwise as seen in FIG. 1, the hook 26 will also swing clockwise to release the keeper 30 and slide the top plate 32 rearwardly to uncover and free the head 22.

The present invention adds to the foregoing structure a compact attachment, merchandisable as a unit for ready installation on the bed plate 16, for subjecting the latching lever 33 to the control of a key-operated lock which is accessible from the front of the car, so that no unauthorized person, not possessing a key for the lock, will be able to pull the rod 36 and open the hood. In FIG. 1 the installed unit is shown at 42. FIGS. 2–5 show the details of the unit which will now be described.

The new unit comprises a base plate member 44 which is readily mounted on the bed plate 16 by a single screw 46, being steadied against shifting about the screw by the interfit of a side cutout with the nut 50 that is threaded on the bolt that holds the strut 18 in place. The rear end of this plate member 44 is slotted, as shown at 52, conveniently by cutting the plate longitudinally and turning up the metal on the sides of the cut to form two spaced apart upstanding flanges 54. The slot 52 is open to the rear edge of the plate member 44 and extends forwardly a sufficient distance to provide an ample path for accommodating movement of the latching lever 33, which stands in the slot as shown in FIGS. 3 and 4, between its operative or hood latching position shown in FIG. 3 and its inoperative or hood releasing position shown in FIG. 4.

A blocking lever 56 is pivoted at 58 to the plate 44 at one side of the slot 52 and extends transversely across the slot, being guided in its swinging movement about the pivot 58 by its fit in undercuts formed in the two slot-defining flanges 54, and being limited in its rear movement by shoulders forming the ends of the undercuts. A coil tension spring 62 stretched between an abutment on the blocking lever 56 and an end edge flange 64 struck up from the plate 44 biases the blocking lever to its rearward position, against the shoulders that terminate the undercuts 60, in which position the blocking lever is transverse of the plate 44 and the slot 52 and lies directly in front of and close to the latching lever 33, as shown in FIG. 3.

On the side of the slot 52 opposite the pivot 58 there is provided a bar 66 which extends longitudinally of the plate 44 and is mounted for longitudinal sliding movement. This mounting is conveniently accomplished by providing the plate 44 with front and rear bearings for the bar, such as the rear bearing formed by a hole in an end edge flange 68 struck up from the plate 44 (opposite to and similar to the end edge flange 62 on the other side of the slot 52), and the front bearing formed by a hole in a front end edge flange 70. The respective ends of the bar project through these edge flange holes, so that the bar is free for limited sliding movement longitudinally of the plate 44.

A compression coil spring 72 surrounds the rear terminal portion of the bar and reacts in tension between the end edge flange 68 and a shoulder formed on the bar, and this biases the bar to forward position.

The bar terminates at its front end in a conventional lock 74 which protrudes through the hole in the front end edge flange 70 which constitutes the front end bearing of the bar. The lock is a well known commercial product and its internal details need not be described. It has a side projecting bolt 76 which is outwardly biased by an internal spring and can be withdrawn only by turning a key 78 in the projecting end of the lock. A ferrule 80 is welded to the inner face of the front end edge flange 70 in surrounding relation to the lock and is of such length that when the lock is pushed inwardly, with rearward sliding movement of the bar 66 to the limit (established by means that will be explained), the bolt 76 will have passed beyond the rear edge of the ferrule and will be projected by its spring (not shown, but inside the lock), thus moving from its retracted FIG. 4 position to its projected FIG. 3 position. In the latter position, of course, the bar 66 is securely locked in its rearward position, and cannot move to its forward position (to which it is biased by the spring 72) until the key 78 is operated in the lock 74 to retract the bolt 76.

Figure 2:
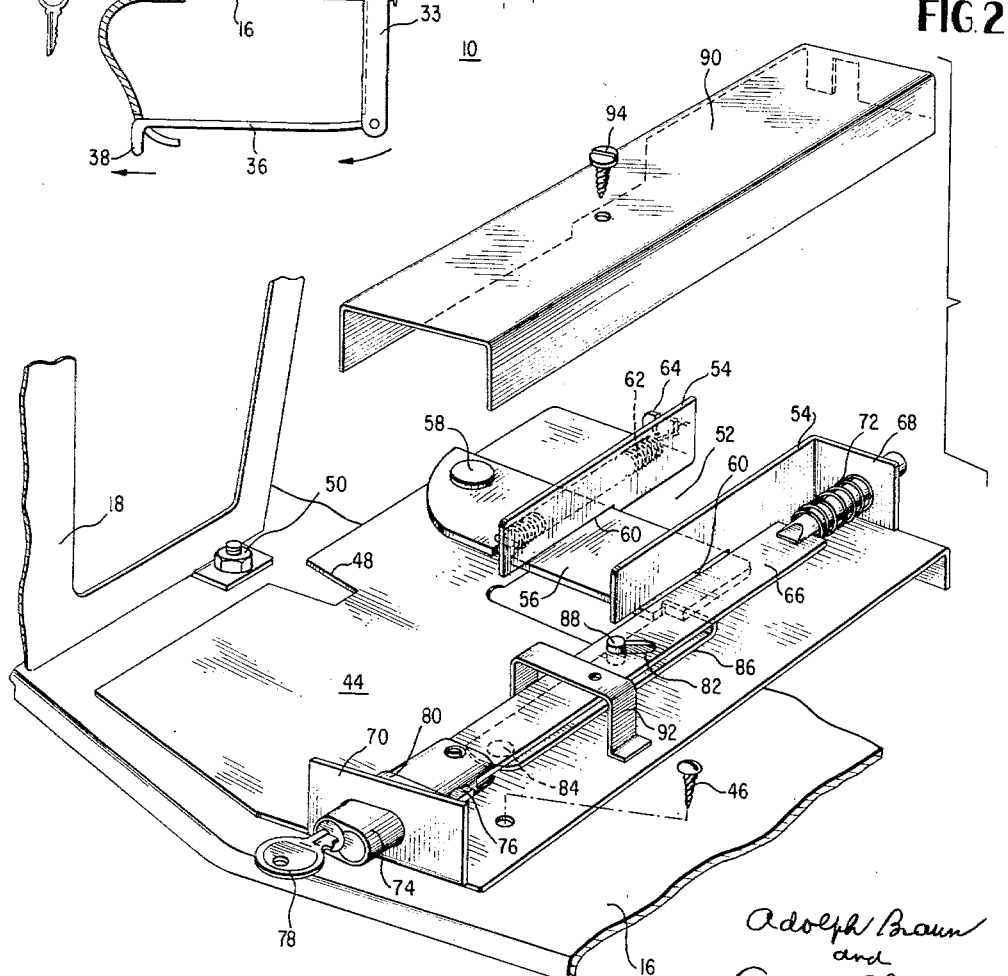
FIG. 2 is an exploded perspective view, on a larger scale, of the locking latch device.

The bar 66 is provided, about midway its length, with a diagonal cam slot 82. Beneath the bar, pivoted at 84 to the plate 44, is a stop lever 86 from which a pin or post 88 projects up through the cam slot and constitutes a cam follower therefor. The free rear end of the stop lever 86 may be flanged up, and the length of the stop lever is such that when it is in its operative position (as shown in FIGS. 2 and 3), substantially parallel to the bar 66, with the bar in its rearward position, having been moved to such position by camming of the follower pin 88 to the front end of the cam slot 82 (with rearward movement of the bar limited by seating of the cam follower in the front end of the cam slot), the rear end of the stop lever 86 will engage the front edge of the blocking lever 56 and thus prevent the free end of the blocking lever from being swung forwardly, as will be clear from FIGS. 2 and 3. As will be evident from FIG. 4, however, when the stop lever 86 is swung out to the position shown in that figure, so as to clear the front edge of the blocking lever 56, the blocking lever is free to swing backwardly about its pivot 58, against the tension of the spring 62, to dispose the parts in their FIG. 4 positions.

A cover plate 90, in the form of an inverted channel, is provided for enclosing the mechanism and preventing tampering as by insertion of a probe or other tool through the grille or up from beneath the car, or otherwise, and such protection is conveniently provided by welding a short low bridge 92 onto the base plate member 44, over the bar 66, to which the cover plate may be fastened by a single screw 94.

It is believed that the operation of the mechanism will be obvious from the foregoing description of the parts and their arrangement and relationship. It may be stated briefly, however, that with the parts in their positions shown in FIG. 3 the hood is locked in closed position because the blocking lever 56 is prevented from swinging forwardly by the engagement of the front end of the stop lever 86 with the front edge of the blocking lever. Thus forward swinging of the hood latching lever 33 is prevented when the rod 36 is pulled. This condition continues until the key 78 is turned in the lock 74. This operation retracts the bolt 76, so that the spring 72 slides the bar 66 forwardly in the ferrule 80 and front and rear bearings in the flanges 68 and 70. This forward sliding of the bar cams the cam follower pin or post 88 outwardly, causing the stop lever 86 to swing clockwise and thus disengaging its free rear end from the front edge of the blocking lever 56. Hence the lever 56 is free to swing forwardly when impinged by the hood latching lever 33, so that the latter can be swung to its hood releasing position by manual pull on the rod 36.

Of course the lock 74 is accessible from the front of the car, as by protruding slightly through the grille 12 or by being located immediately behind an opening in the grillework, so that the key 78 is easily inserted into the lock and operated as hereinbefore explained.

It is to be understood that the invention is capable of modification in details, particularly to accommodate automobiles of various design and arrangement, and that all such modifications in details, to the extent that they embody the principles of the invention as defined by the appended claims, are to be deemed within the scope and purview thereof.

We claim:

1. A locking latch device for the free front end of the rear end hinged hood of an automobile engine compartment having a front grille and a horizontal bed plate behind said grille and having a hood latching lever mounted in said compartment for swinging movement through a vertical plane and manually operable for movement from an operative rear position latching the hood in closed position to a retracted forward position releasing the hood for movement to open position, said device comprising a plate member secured on said bed plate having a slot opening from its rear edge straddling the hood latching lever in its movement, a blocking lever pivoted on said plate member at one side of said slot and extending across the inner end of the slot in front of the hood latching lever, spring means biasing the blocking lever rearwardly to a position blocking movement of the hood latching lever forwardly from hood latching position to hood releasing position, a bar extending longitudinally along the plate member on the opposite side of the slot and mounted on the plate member for sliding forward and rearward movement and having a cam surface, a stop lever pivoted on the plate member beneath the bar for swinging movement between an operative position blocking the free end of the blocking lever to prevent forward swinging movement thereof from said hood latching lever blocking position and an inoperative position clearing the blocking lever for forward swinging movement when engaged by said hood latching lever, spring means biasing the bar to its forward position, a cam follower element provided on the stop lever and engaged with the cam surface of the bar and operative to swing the stop lever from its blocking lever freeing position to its blocking lever blocking position when the bar moves to its rear position, and a lock provided on the forward end of the bar and operable through the grille for locking the bar in its rearward position and thus locking the hood latching lever in latching position.

2. The locking latch device claimed in claim 1, in which the front and rear ends of the plate member are turned up to form upstanding flanges having apertures therein, the aperture of the front flange constituting a bearing for the lock end of the bar and the aperture of the rear flange constituting a bearing for the rear end of the bar.

3. The locking latch device claimed in claim 1, in which the front and rear ends of the plate member are turned up to form upstanding flanges having apertures therein, the aperture of the front flange constituting a bearing for the lock end of the bar and the aperture of the rear flange constituting a bearing for the rear end of the bar, and in which the spring means biasing the bar to its forward position is a compression spring disposed around the rear end portion of the bar and reacting between the rear flange and a shoulder formed on the rear portion of the bar.

4. The locking latch device claimed in claim 1, which includes a member rigid with the front end of the plate member, and in which the lock provided on the forward end of the bar includes a bolt spring biased to project laterally into engagement behind said last named member when the bar is moved to its rearward position, whereby movement to said position locks the bar in its rearward position to lock the hood latching lever in latching position.

5. The locking latch device claimed in claim 1, including a cover secured over the bar and stop lever, enclosing the same and thereby preventing tampering therewith.

6. The locking latch device claimed in claim 1, in which the plate member is provided with a pair of upstanding flanges defining the sides of the slot, each flange being undercut to provide a guideway for the blocking lever terminating in a shoulder formed on each flange and constituting a stop means limiting rearward movement of the blocking lever.

7. The locking latch device claimed in claim 1, including a bridge welded to the plate member and spanning the bar and stop lever, and a cover comprising an inverted channel disposed over the bar and stop lever, enclosing the same and thereby preventing tampering therewith, and secured in place on the plate member by being screwed to said bridge.

References Cited by the Examiner
UNITED STATES PATENTS

| | | | |
|---|---|---|---|
| 2,227,253 | 12/40 | Gill | 70—240 X |
| 2,723,552 | 11/55 | Dlugatch | 70—240 |
| 2,743,601 | 5/56 | Dlugatch | 70—240 |

ALBERT H. KAMPE, *Primary Examiner.*

BOBBY R. GAY, *Examiner.*